(12) United States Patent
Keeney et al.

(10) Patent No.: US 11,428,497 B1
(45) Date of Patent: Aug. 30, 2022

(54) BOW STABILIZERS WITH MAGNETIC DAMPING

(71) Applicant: Bear Archery, Inc., Evansville, IN (US)

(72) Inventors: Sean Keeney, Henderson, KY (US); David Alsip, Evansville, IN (US); James Mogle, Evansville, IN (US)

(73) Assignee: Bear Archery, Inc., Evansville, IN (US)

( * ) Notice: Subject to any disclaimer, the term of this patent is extended or adjusted under 35 U.S.C. 154(b) by 0 days.

(21) Appl. No.: 17/445,634

(22) Filed: Aug. 23, 2021

(51) Int. Cl.
  *F41B 5/20* (2006.01)
  *F41B 5/14* (2006.01)
  *F16F 15/03* (2006.01)

(52) U.S. Cl.
  CPC .......... *F41B 5/1426* (2013.01); *F16F 15/03* (2013.01)

(58) Field of Classification Search
  CPC .................................................. F41B 5/1426
  See application file for complete search history.

(56) References Cited

U.S. PATENT DOCUMENTS

| | | | |
|---|---|---|---|
| 3,683,883 | A | 8/1972 | Izuta |
| 5,975,070 | A | 11/1999 | Sands |
| 8,590,522 | B2 | 11/2013 | Khoshnood et al. |
| 9,016,268 | B2 | 4/2015 | Leven |
| 9,038,618 | B1 | 5/2015 | Bomar |
| 10,436,543 | B2 | 10/2019 | Wilkens |
| 10,704,858 | B1 | 7/2020 | Mason et al. |
| 10,753,701 | B2 | 8/2020 | Jonas, IV et al. |
| 2013/0055998 | A1 | 3/2013 | LoRocco et al. |

*Primary Examiner* — John A Ricci
(74) *Attorney, Agent, or Firm* — Woodard, Emhardt, Henry, Reeves & Wagner, LLP

(57) ABSTRACT

Aspects of the present disclosure deal with stabilizers for an archery bow which incorporate a magnetic damping assembly. In one form, the stabilizer includes a housing having a length defining a proximal end and a distal end, wherein the proximal end is configured to secure the housing to an archery bow. A ferromagnetic mass formed of a ferromagnetic material is arranged adjacent the distal end of the housing. A magnet is also arranged adjacent the distal end of the housing. The magnet and the mass are spaced a preset distance apart. The ferromagnetic mass is able to oscillate relative to the magnet when vibrations are transferred to the stabilizer. The magnetic field applies a drag force which dampens the oscillation of the magnet relative to the ferromagnetic mass.

18 Claims, 10 Drawing Sheets

BOW STABILIZERS WITH MAGNETIC DAMPING

FIELD OF THE DISCLOSURE

Aspects of the present invention deal with archery bows, and in particular deal with accessories such as stabilizers usable with archery bows.

BACKGROUND

A bow stabilizer may be used to assist an archer in aiming an archery bow. A typical bow stabilizer includes a stabilizer body connected to a riser of the bow with one or more threaded fasteners. The stabilizer is often made from a single unitary component and/or from a combination of components. Typically, stabilizers include a vibration reducing material such as rubber. In other examples, stabilizers are made from lightweight materials such as carbon fiber. In many stabilizers, one or more weights may be added to the distal end of the stabilizer in order to assist an archer in balancing a bow.

Typical bow stabilizers reduce vibration by absorbing the vibration within the vibration reducing material. In other examples, the vibration is reduced due to the added weight at the end of the stabilizer to dampen the bow's vibrations. Excessive vibration and/or the effects of vibration over time may lead to wear and tear on the bow. As should be appreciated, mitigating the amount of wear and tear on the bow is desirable to an archer. As a result, vibration transfer from the stabilizer into the bow is undesirable to an archer. Stabilizers also decrease the amount of recoil or "hand shock" felt by an archer after a shot. As should be appreciated, reducing the recoil of the shot enables an archer to shoot for longer periods and with a greater amount of comfort and accuracy.

Stabilizers are also used by archers to increase stability of the bow when at full draw. For example, a forwardly weighted stabilizer will act as a counterbalance to the bow at full draw lessening pin movement and increasing accuracy.

SUMMARY

Representative embodiments provide stabilizers for an archery bow which incorporate a magnetic damping assembly. In one form, the stabilizer includes a housing having a length defining a proximal end and a distal end, wherein the proximal end is configured to secure the housing to an archery bow. A mass formed of a ferromagnetic material is arranged adjacent the distal end of the housing. A magnet is also arranged adjacent the distal end of the housing. The magnet and the mass are spaced a preset distance apart. The ferromagnetic mass is able to oscillate relative to the magnet. The mass is arranged within the magnet's magnetic field and the magnetic field force between the mass and the magnet correlates to the preset distance. Upon a shot, vibrations transferred to the stabilizer cause the mass to oscillate relative to the magnet, the magnetic field applies a drag force which dampens the oscillation and accordingly dampens vibrations within the archery bow.

In certain forms, a ferromagnetic mass is mounted to the distal end of the housing. Disposed and extending longitudinally within an interior portion of the housing is a magnet assembly including a shaft with first end and a second end. The first end of the shaft is mounted to the proximal end of the housing. A magnet is mounted to the second end of the shaft. The magnet and the mass are arranged within the interior of the housing a preset distance apart. Vibrations transferred to the stabilizer cause the second end of the shaft and the magnet may oscillate within the housing relative to the ferromagnetic mass. As the magnet oscillates relative to the mass, the magnetic field applies a drag force which dampens the oscillation and accordingly dampens vibrations within the archery bow.

In other embodiments, a magnetic damping assembly is mounted to the distal end of the housing. The magnetic damping assembly includes a ferromagnetic mass housed within a damping component made from a flexible vibration damping material. A magnet is also housed within the damping component, a set distance from the ferromagnetic mass. The damping component allows the mass and magnet to oscillate relative to each other. When the mass oscillates relative to the magnet, the magnetic field applies a drag force which dampens the oscillation and accordingly dampens vibrations within the archery bow.

Other objects and attendant advantages will be readily appreciated, as the same become better understood by reference to the following detailed description when considered in connection with the accompanying drawings.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the disclosure relates.

Representative embodiments provide stabilizers for an archery bow which incorporate a magnetic damping assembly. In one form, the stabilizer includes a housing having a length defining a proximal end and a distal end, wherein the proximal end is configured to secure the housing to an archery bow. A ferromagnetic mass formed of a ferromagnetic material is arranged adjacent the distal end of the housing. A magnet is also arranged adjacent the distal end of the housing. The magnet and the mass are spaced a preset distance apart. The ferromagnetic mass is able to oscillate relative to the magnet. The mass is arranged within the magnet's magnetic field and the magnetic field force between the mass and the magnet correlates to the preset distance. Upon a shot, vibrations of the archery bow are transferred to the stabilizer, causing the mass to oscillate relative to the magnet, the magnetic field applies a drag force which dampens the oscillation and accordingly dampens vibrations within the archery bow.

Figure 1:
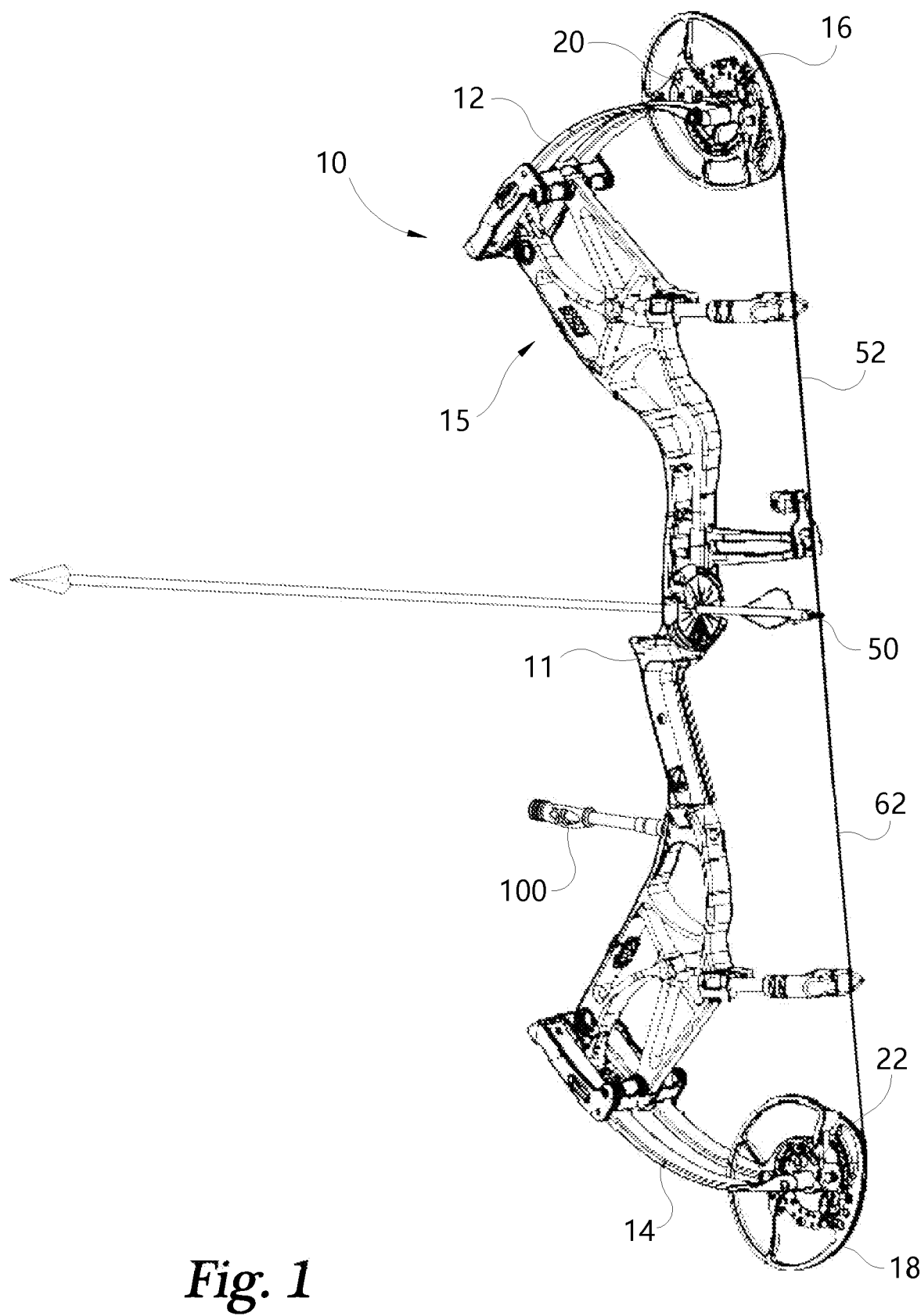
FIG. 1 is a perspective view of a representative embodiment of an archery bow with a bow stabilizer according to an embodiment of the present disclosure.

FIG. 1 illustrates a representative example of an archery bow 10 incorporating a stabilizer 100 according to an embodiment of the present disclosure. Bow 10 includes a riser 11 with a handle, an upper limb or pair of limbs 12 and a lower limb or pair of limbs 14. In the embodiment shown, upper and lower limbs are formed of parallel and symmetric limbs sometimes called a quad limb arrangement. Alternately, a single piece limb can have a notch or slot area removed to allow a rotational element to be mounted to the limb tips. In the single cam example, illustrated, rotational members such as idler wheel 16 and eccentric cam 18 are supported at the limb tip sections for rotary movement about axles 20 and 22. An upper pulley axle 20 is carried between the outer limb tip portions of upper limb 12. A lower pulley axle 22 is carried between the outer limb tip portions of lower limb 14.

The portion of the cable, which defines the bowstring 50, includes an upper portion 52 and a lower portion 62 which are fed-out from idler wheel 16 and cam 18 when the bow is drawn. The upper portion 52 may be part of a longer cable which has a medial portion mounted around idler wheel 16 with the ends mounted to cam 18. The non-bowstring portion of the cable extending from wheel 16 to cam 18 can be referred to as the return cable portion. Additionally, a y-yoke anchor cable (not shown for ease of illustration) has a lower end mounted to cam 18, which extends to two upper ends mounted adjacent opposing ends of axle 20. Each cable has a thickness and a round cross-section defining a circumference. From the perspective of the archer, the bowstring is considered rearward relative to the riser, which defines forward.

When the bowstring 50 is drawn, it causes idler wheel 16 and cam 18 at each end of the bow to rotate, feeding out cable and bending limbs 12 and 14 inward, causing energy to be stored therein. When the bowstring 50 is released with an arrow engaged to the bowstring, the limbs 12 and 14 return to their rest position, causing idler wheel 16 and cam 18 to rotate in the opposite direction, to take up the bowstring 50 and launch the arrow with an amount of energy proportional to the energy initially stored in the bow limbs. Bow 10 is described for illustration and context and is not intended to be limiting.

While not illustrated, embodiments of the present disclosure can also be used in other types of bows, for example, dual cam or two cam bows, hybrid cam bows or recurve bows, which are considered conventional for purposes of the present disclosure. For convenience, the combination of riser 11 and either single or quad limbs forming upper limb 12 and lower limb 14 may generally be referred to as archery bow body 15. Accordingly, it should be appreciated that the archery bow body can take on various designs in accordance with the many different types of bows with which the present disclosure can be used.

Various accessories, such as arrow rests, bow sights, and quivers can be mounted to bow body 15. Commonly, bow sights are used in combination with a peep sight. Bow sights are typically mounted to or formed as part of riser 11 above the arrow rest position. Generally, the sight defines at least one aiming point.

Figure 2:
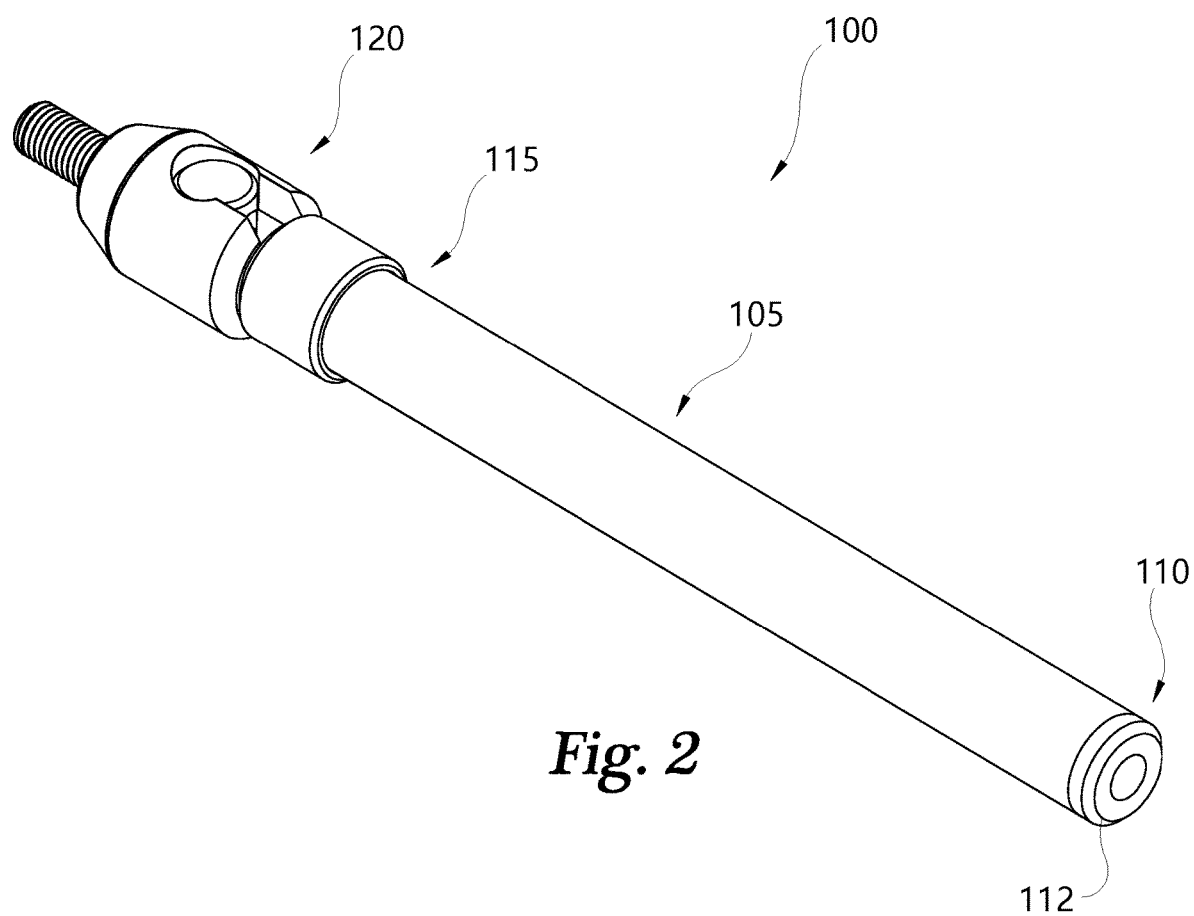
FIG. 2 is a perspective view of a bow stabilizer according to an embodiment of the present disclosure.
Figure 3:
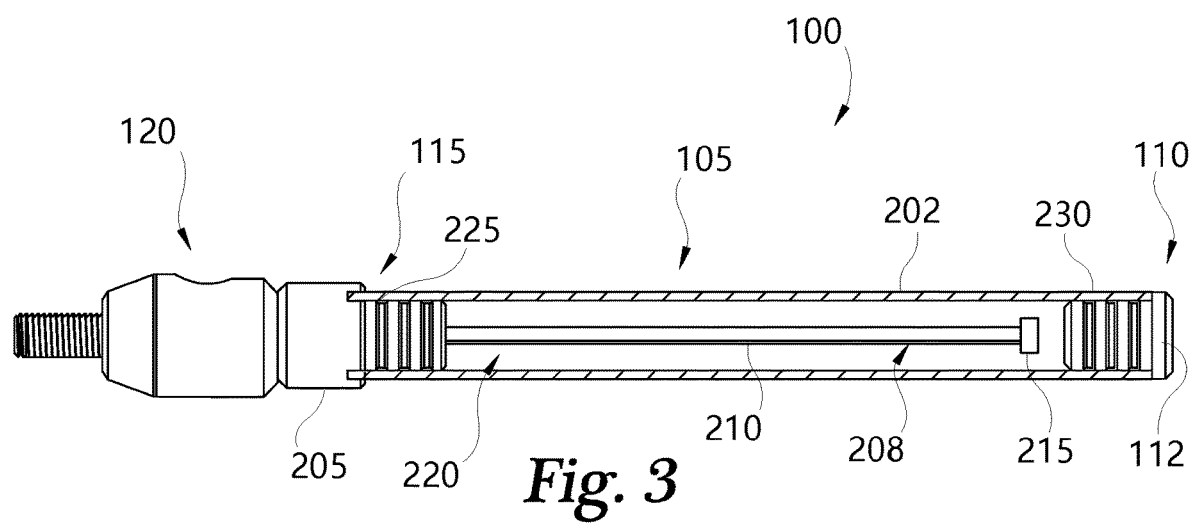
FIG. 3 is a side view of the bow stabilizer of FIG. 2.
Figure 4:
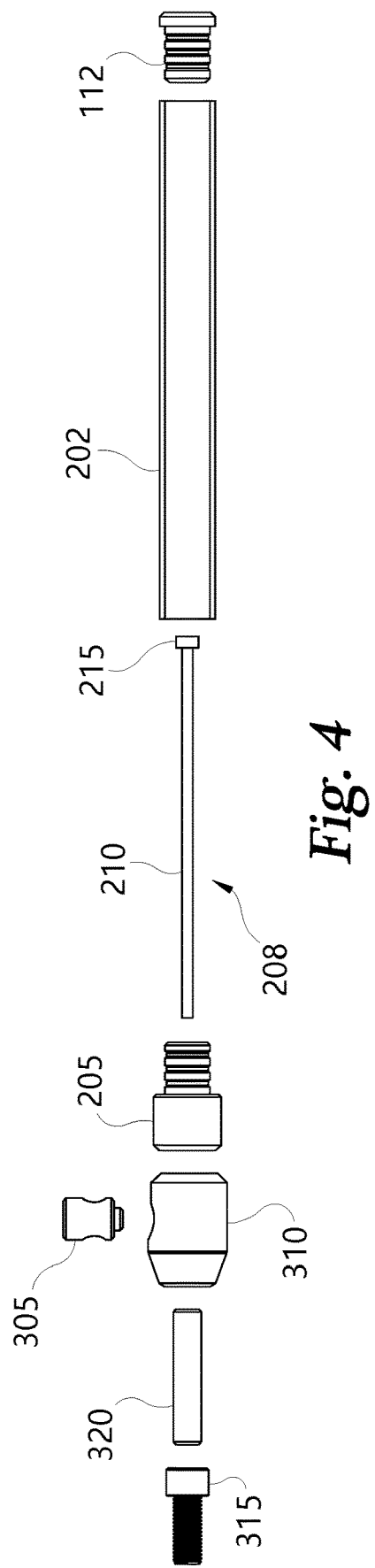
FIG. 4 is an exploded view of the bow stabilizer FIG. 2.
Figure 5:
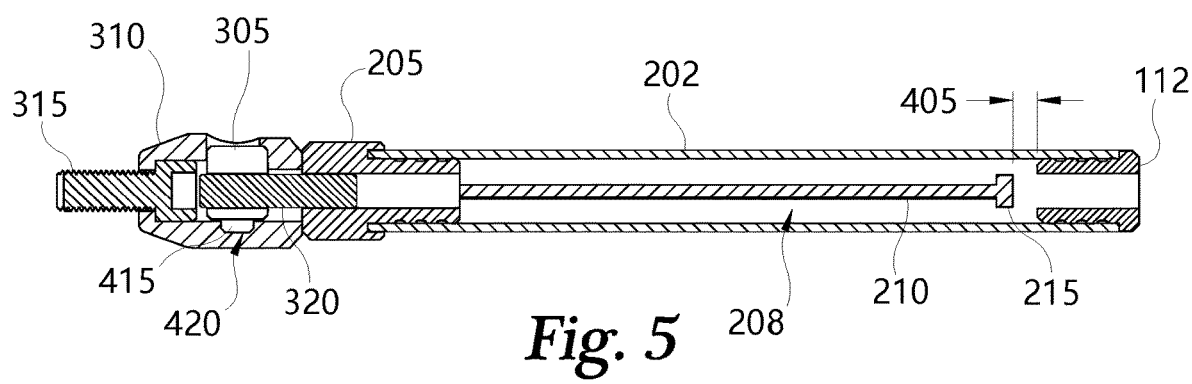
FIG. 5 is a cross-sectional view of the bow stabilizer of FIG. 2.
Figure 6:
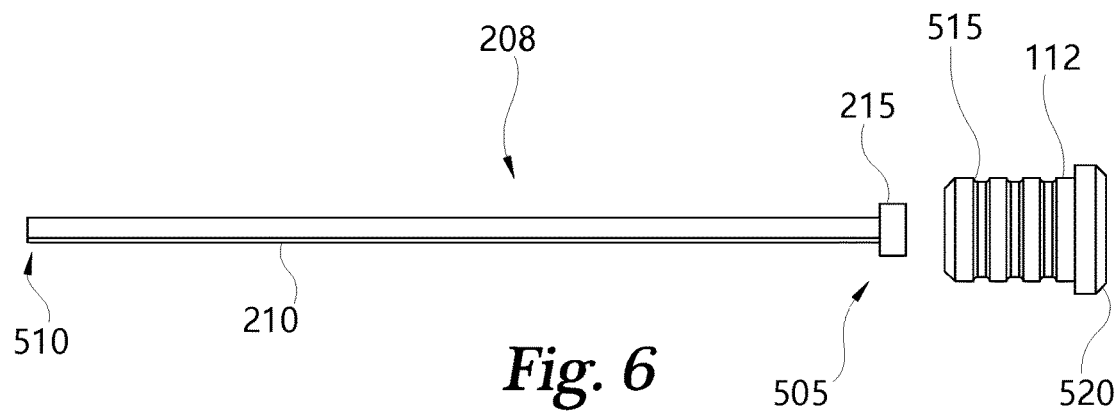
FIG. 6 is a side view of a magnet assembly according to an embodiment of the present disclosure.

FIG. 2 illustrates an example of a stabilizer 100 according to an embodiment of the present disclosure. The stabilizer 100 generally includes a body 105, a mounting assembly 120, and a ferromagnetic mass 112. Typically, the stabilizer 100 is mounted to an archery bow to assist in reducing bow vibration following a shot. The stabilizer 100 is also used to provide a counterbalancing weight to the bow to assist in stabilization of the bow at full draw.

The stabilizer body 105 may include a rearward or proximal end 115, which is typically nearer the bow, and a forward or distal end 110, which is typically further from the bow. The body 105 is generally formed from a lightweight material. For example, the stabilizer body 105 may be made from carbon fiber. The carbon fiber material provides a lightweight stabilizer, thus reducing overall weight of the stabilizer. In another example, the body 105 may be made from rubber. As should be appreciated, a rubber stabilizer will absorb/dampen vibration more efficiently after a shot, but would add weight compared to carbon fiber.

The mounting assembly 120 is generally mounted to the proximal end 115 of the stabilizer body 105. The mounting assembly enables an archer to mount and remove the stabilizer from the bow. For example, the stabilizer may be mounted to the riser of the bow directly via a threaded fastener. In another example, the stabilizer may be mounted to the riser of the bow indirectly via a quick disconnect mechanism. The quick disconnect enables an archer to remove the stabilizer from the bow without needing to unscrew the mounting assembly 120 from the riser.

FIGS. 3-6 illustrate multiple views of stabilizer 100 as a representative embodiment. As can be seen, the body 105 generally includes a housing 202 having a distal end 230 and a proximal end 225 defining a length. In one form, the housing 202 is a hollow rod formed from a carbon or plastic material. In another form, the housing 202 is formed from a rubber material with a hollow interior. In yet another form, the housing 202 is a hollow carbon rod filled with a vibration dampening material.

Typically mounted to the distal end 230 of the housing 202 is the ferromagnetic mass 112. In one example, the ferromagnetic mass is made from a ferromagnetic material such as, iron, cobalt, nickel, and/or an alloy of iron, cobalt, and/or nickel. The mass includes a head 520 and a body 515 (best shown in FIG. 6). The body 515 is typically inserted into the distal end 230 of the housing and extends within an interior portion 220 of the housing towards the proximal end 225. The head 520 is configured to abut the distal end 230 of the housing 202 to prevent the mass 112 from being inserted too far into the housing 202. The mass 112 is generally secured to the housing 202 via a friction fit. In other examples, the mass 112 is secured to the housing 202 via threads, an adhesive material or a mechanical fastener. In one example, the mass 112 is hollow to save weight. In another example, the mass 112 is a solid metal mass to increase the magnetic surface area. However, in other examples, the mass 112 is formed from another magnetic material, for example, a diamagnetic or paramagnetic material.

Housed within the interior portion 220 of the housing 202 is a magnet assembly 208. The magnet assembly 208 includes a shaft 210 and a magnet 215. The shaft 210 has a proximal or first end 510 and a distal or second end 505 defining a length (best shown in FIG. 6). The first end 510 mounts to an outsert 205 housed partially within the proximal end 225 of the housing 202 and the shaft extends longitudinally within the housing. The second end 505 is arranged within the interior portion 220 towards the distal end 230 of the housing 202. The second end 505 includes the magnet 215. Preferably, the magnet 215 is a permanent magnet. For example, the magnet 215 may be a rare-earth magnet, AlNiCo magnet, and/or a ceramic magnet. The magnet 215 may be removable from the shaft 210. However, in other examples, the magnet 215 is permanently fixed to the shaft 210.

In an alternate stabilizer embodiment, the magnet 215 and mass 112 may swap positions. For example, the magnet may be housed in the distal end 230 of the stabilizer, while the ferromagnetic mass is mounted to the second end 505 of the shaft 210. Unless otherwise indicated, the positions of the mass and the magnet can be reversed in various embodiments. References herein to the mass oscillating relative to the magnet or oscillating relative to each other are intended to encompass arrangements where the mass has greater movement while the magnet stays in a relatively fixed position and also arrangements where the magnet has greater movement while the mass stays in a relatively fixed position.

The ferromagnetic mass 112 interacts with a magnetic field of magnet 215. The magnetic field applies a drag force which dampens oscillation of the stabilizer 100 after a shot. For example, movement of mass 112 relative to magnet 215 generates magnetic flux and eddy currents between the mass 112 and magnet 215. The eddy currents produce a drag force on the mass 112 relative to the magnet 215 through the process of magnetic damping. Thus, as the mass 112 oscillates relative to the magnetic field, changes in magnetic flux generate opposing eddy currents, which apply a drag force to the shaft 210 and dampen oscillation of the stabilizer 100.

The effect of the magnetic field may be strengthened or weakened by adjusting a distance 405 between the magnet 215 and the mass 112. In one embodiment, the distance 405 between the magnet 215 and the mass 112 is preset to about 3 mm. In another embodiment, the distance 405 is preset anywhere between 0-20 mm depending on the application. In yet another embodiment, the distance 405 may be adjusted by a user to customize the magnetic field strength. The distance 405 may be adjusted by advancing or retracting the length of the shaft 210. In one example, the shaft 210 includes a threaded portion on the first end 510 arranged so that rotating the shaft advances or retracts the shaft within the housing. For example, the shaft may be rotated clockwise to shorten the shaft 210, thus increasing the distance 405. In another example, the shaft may be rotated counterclockwise to lengthen the shaft 210, thus decreasing the distance 405.

In one illustrative example, following a shot, vibration transfers through the bow limbs and into the riser. From the riser, the vibrations transfer into the stabilizer and hereby causes the shaft 210 and magnet 215 to begin oscillating. As the magnet 215 oscillates, the magnetic field moves with respect to the mass 112. The relative movement generates eddy currents, which in turn generate a drag force on the magnet 215 and shaft 210. The drag force dampens the oscillation of the stabilizer 100 and the archery bow. As should be appreciated, lowering the overall vibration of the stabilizer enables an archer to shoot a bow more accurately and without as much wear and tear on the bow.

The mounting assembly 120 may include outsert 205, which is typically mounted to a proximal end 225 of the housing 202. The outsert 205 is secured to the housing 202 via a friction fit. In other examples, the outsert 205 is secured to the housing 202 via threads, an adhesive material or a mechanical fastener. The outsert 205 is generally formed from a polymeric material, for example, plastic. However, in other examples, the outsert 205 may be formed from rubber or a similar flexible material.

The mounting assembly 120 (shown in FIG. 4) further includes a fastener 315 and a rod 320, which interact with mount housing 310. Fastener 315 is typically in the form of a threaded bolt and enables an archer to mount the stabilizer to the riser of an archery bow. Rod 320 is generally in the form of a threaded rod. In other embodiments, rod 320 is in the form of an unthreaded rod. Rod 320 interacts with a quick detach mechanism 305 and the outsert 205 to secure the body 105 to the mounting assembly 120. The quick detach mechanism 305 mates within a channel 420 (best shown in FIG. 5) of the mount housing 310 via a detent 415.

Figure 7:
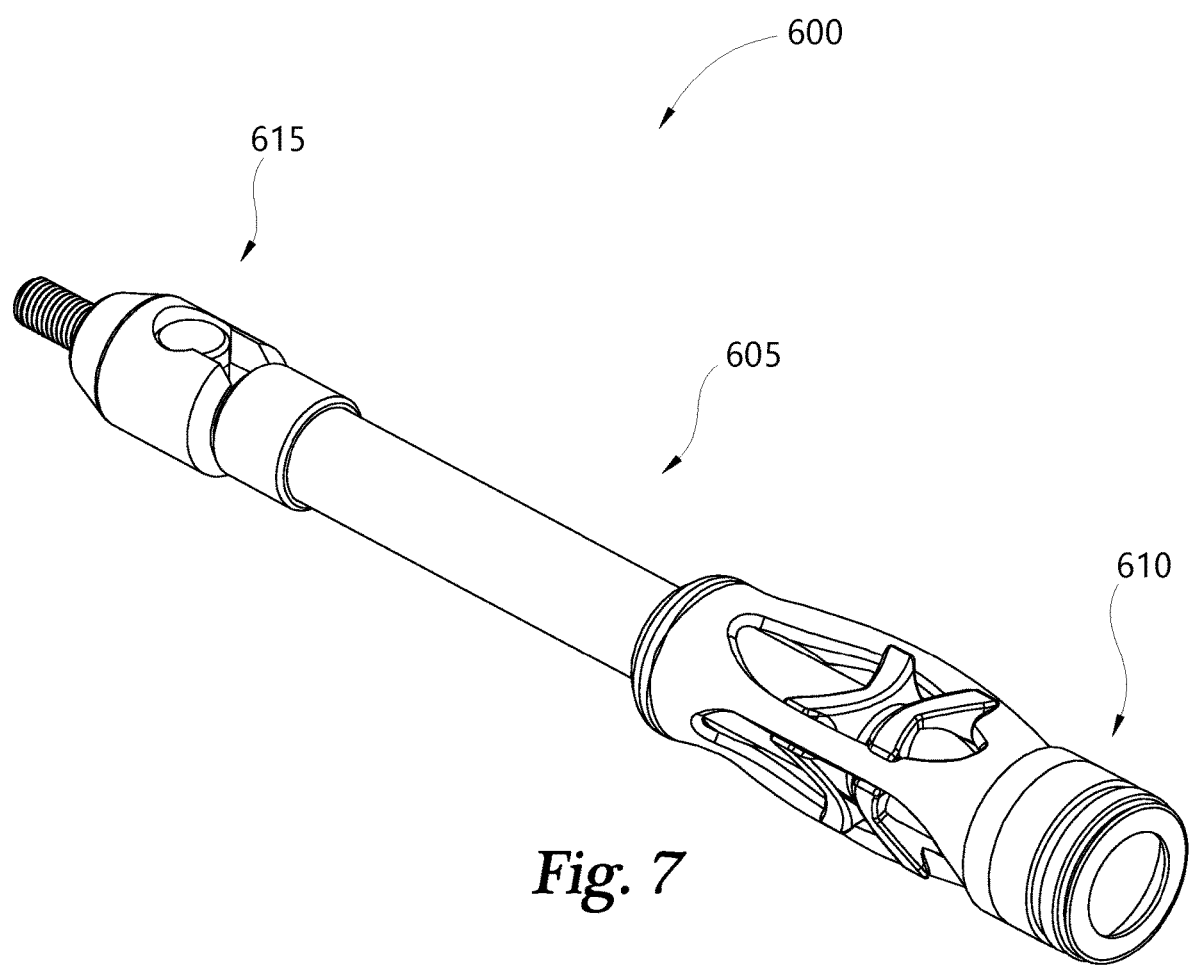
FIG. 7 is a perspective view of a bow stabilizer according to another embodiment of the present disclosure.
Figure 8:
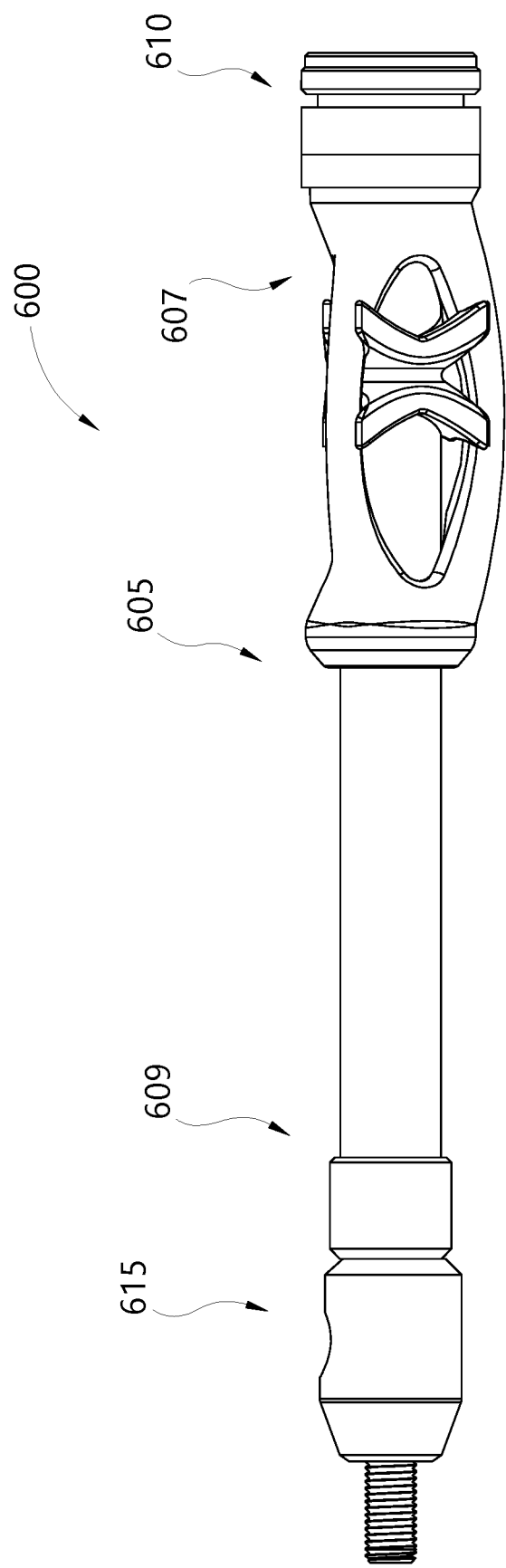
FIG. 8 is a side view of the bow stabilizer of FIG. 7.

FIGS. 7 and 8 illustrate an example of a stabilizer 600 according to an alternate representative embodiment of the present disclosure. The stabilizer 600 generally includes a body 605, and a mounting assembly 615, and a magnetic damping assembly 610. As illustrated in FIG. 1, typically, the stabilizer 600 is mounted to an archery bow to assist in reducing bow vibration following a shot. The mounting assembly 615 is generally configured in the same way as mounting assembly 120, enabling an archer to mount and remove stabilizer 600 from a bow. The stabilizer 600 is also used to provide a counterbalancing weight to the bow to assist in stabilization of the bow at full draw.

The stabilizer body 605 may include a rearward or proximal end 609, which is typically nearer the bow, and a forward or distal end 607, which is typically further from the bow. The body 605 is generally formed from a lightweight material. For example, the stabilizer body 605 may be made from carbon fiber, plastic or similar materials. A carbon fiber material provides a lightweight stabilizer, thus reducing overall weight of the stabilizer. In another example, the body 605 may be made from rubber. As should be appreciated, a rubber stabilizer will absorb/dampen vibration more efficiently after a shot, but would add weight compared to carbon fiber.

The magnetic damping assembly 610 is generally mounted to the distal end 607 of the stabilizer body 605. The magnetic damping assembly 610 dampens the vibrations from the bow following a shot, while minimizing vibration transfer back into the bow. As should be appreciated, the damping assembly 610 also assists in noise reduction of the bow after a shot. In some examples, the magnetic damping assembly 610 may include one or more weights configured to counterbalance the bow at full-draw. The counterbalancing force of the weights assist an archer in stabilizing the bow during the shot.

Figure 9:
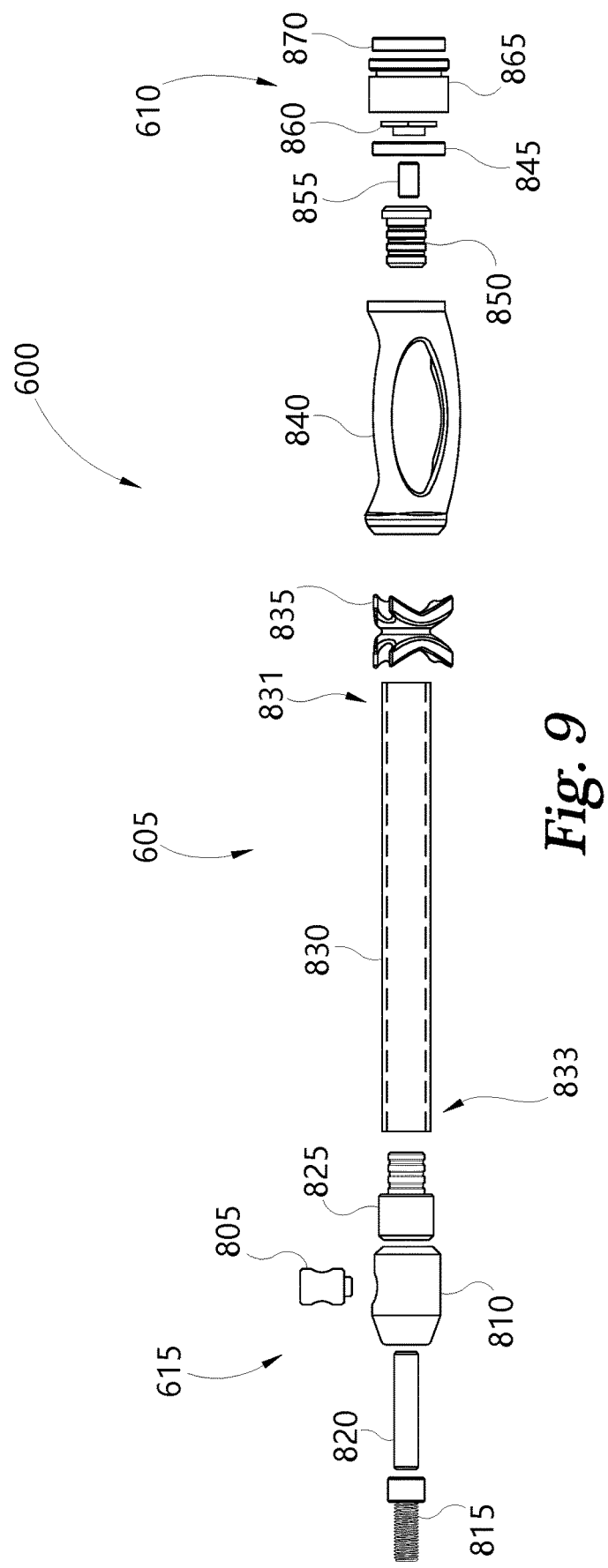
FIG. 9 is an exploded view of the bow stabilizer FIG. 7.
Figure 10:
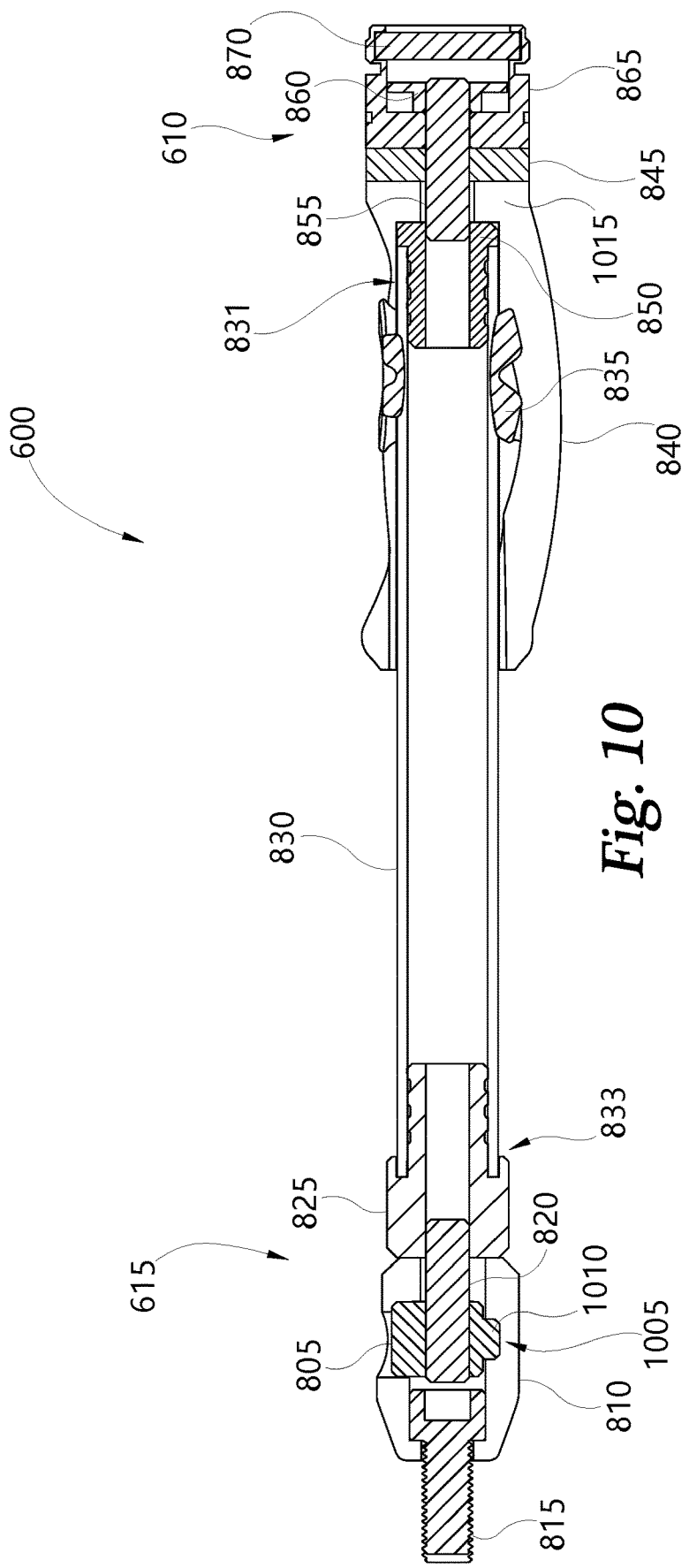
FIG. 10 is a cross-sectional view of the bow stabilizer of FIG. 7.

FIGS. 9 and 10 illustrate exploded and cross-sectional views of the stabilizer 600. As best seen in FIG. 9, the body 605 generally includes a housing 830 having a distal end 831 and a proximal end 833 defining a length. In one form, the housing 830 is a rod or cylinder formed from a carbon or plastic material. The rod may be hollow or solid. In another form, the housing 830 is formed from a rubber material. In yet another form, the housing 830 is a hollow carbon rod filled with a vibration dampening material.

The magnetic damping assembly 610 includes a damping component 865. The damping component 865 is generally made from an elastic vibration damping material, such as rubber. However, in other embodiments, the damping component 865 made be a polymeric material. Typically, the damping component 865 is mounted to the distal end 831 of the housing 830 via a shaft 855 and a ferromagnetic mass 860. The ferromagnetic mass 860 is generally made from a ferromagnetic material such as, iron, cobalt, nickel, and/or an alloy of iron, cobalt, and/or nickel. The ferromagnetic mass 860 is typically housed within the damping component 865. In some embodiments, the ferromagnetic mass 860 is removable from the damping component 865. However, in other embodiments, the ferromagnetic mass may be molded within the damping component and is not removable.

Also housed within the damping component 865 is a magnet 870. Magnet 870 may be arranged outside of housing 830. The damping component holds the ferromagnetic mass and the magnet at a spaced apart distance and allows the ferromagnetic mass and magnet to oscillate relative to each other when vibrations are transferred to the stabilizer from the archery bow.

The magnet 870 is typically oriented within the damping component 865 a set distance away from the ferromagnetic mass 860. In one embodiment, the distance between the magnet 870 and the ferromagnetic mass 860 is about 3 mm. In other embodiments, the distance between the magnet and the ferromagnetic mass is less than 10 mm. As should be appreciated, the interaction between the magnet 870 and the ferromagnetic mass 860 generates a magnetic force, which assists in damping oscillation of the stabilizer after a shot. Preferably, the magnet 870 is a permanent magnet. For example, the magnet 870 may be a rare-earth magnet, AlNiCo magnet, and/or a ceramic magnet. In some examples, the magnet 870 also serves as an end weight for the stabilizer, enabling an archer to reduce pin movement during a shot.

Figure 11:
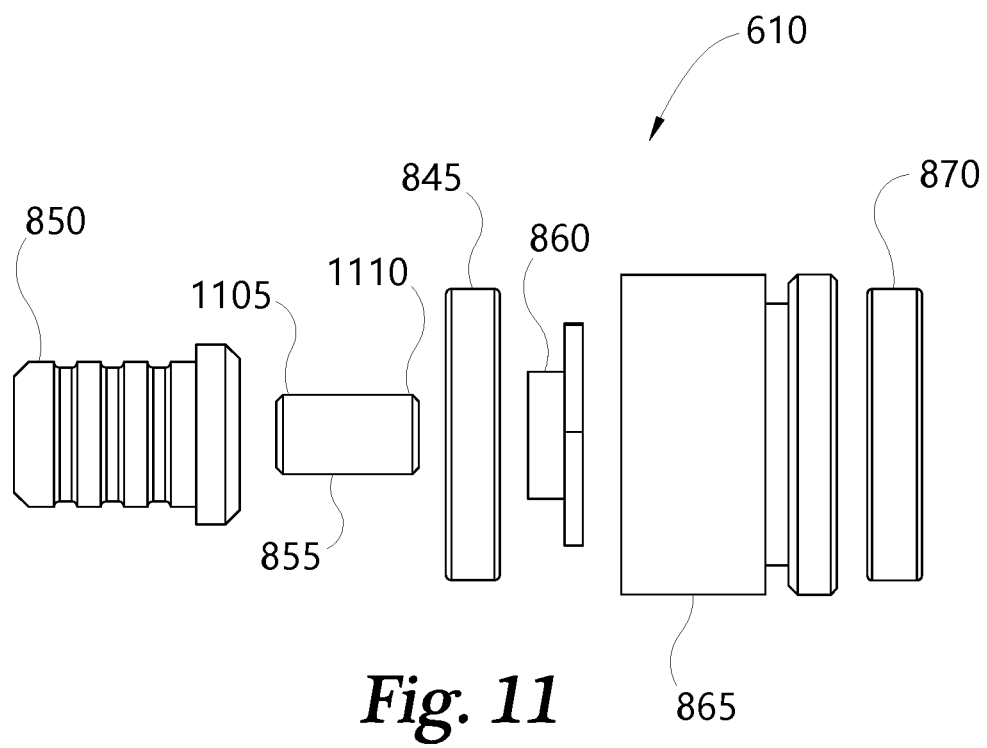
FIG. 11 is an exploded view of a magnetic damping assembly according to another embodiment of the present disclosure.
Figure 12:
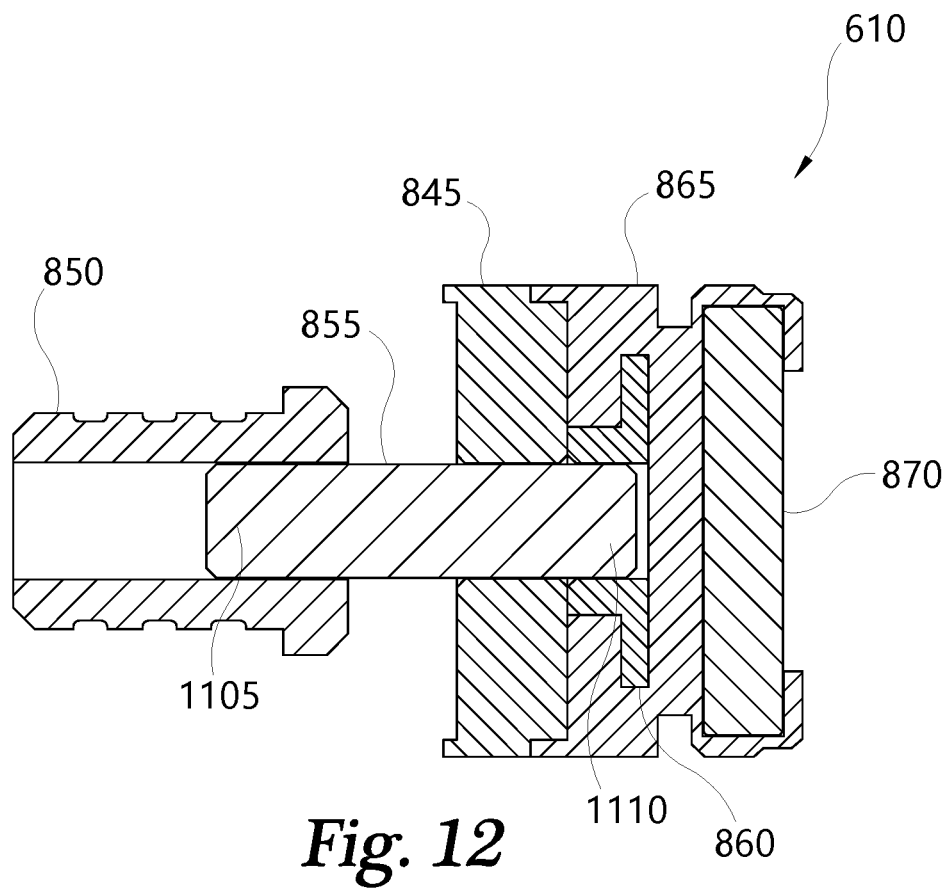
FIG. 12 is a cross-sectional view of the magnetic damping assembly of FIG. 11.

A shaft 855 may serve as the connection for mounting the magnetic damping assembly 610 to the housing 830. The shaft 855 has a first end 1105 and a second end 1110 (best shown in FIGS. 11 and 12). The first end 1105 of the shaft 855 interacts with an insert 850, which is typically housed partially within the distal end 831 of the housing 830. The second end 1110 of the shaft 855 mounts to the ferromagnetic mass 860. The shaft 855 may be in the form of a smooth pin, which secures to the insert 850 and the ferromagnetic mass 860 via a friction-fit. The shaft 855 may alternatively be in the form of a threaded rod, which is secured to the insert 850 and the ferromagnetic mass 860 via threaded connections.

In some embodiments, one or more weights 845 are located on the shaft 855. The one or more weights 845 are typically spaced between the damping component 865 and the insert 850. In one example, the weights 845 are adjustable to enable an archer to lighten the stabilizer by removing weights and/or increase the weight of the stabilizer by adding weights. To assist in vibration damping, the stabilizer 600 may include a coupling 835 and a damper 840. The coupling 835 and damper 840 are typically made from an elastic vibration damping material, such as rubber. The coupling 835 is fits around a circumference of the housing 830 and secure via a friction-fit. The coupling 835 is substantially triangular in shape and is configured to support the damper 840. The damper 840 is secured via a retention portion 1015. The retention portion 1015 is secured via the shaft 855 between the insert 850 and the weights 845 in a sandwich configuration.

In one illustrative example, following a shot, vibration transfers through the bow limbs and into the riser. From the riser, vibrations transfer into the stabilizer and through the housing 830 into the magnetic damping assembly 610. The coupling 835 and the damper 840 may absorb some of the vibration. The remaining vibration is transferred to the magnetic damping assembly. The vibration causes the magnet 870 to being oscillating perpendicular to the stabilizer 100. Oscillation of the magnet 870 corresponds to oscillation of the magnetic field with respect to the ferromagnetic mass 860, generating eddy currents. The eddy currents create a drag force on the magnet 870 damping oscillation of the magnet 870, without transferring vibration back into the housing 830. As should be appreciated, reducing the overall vibration of the stabilizer enables an archer to shoot a bow more accurately and without as much wear and tear on the bow.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A stabilizer for an archery bow, comprising:
    a housing having a length defining a proximal end and a distal end, wherein the proximal end is configured to secure the housing to an archery bow;
    a ferromagnetic mass mounted to the distal end of the housing;
    a magnet mounted to the distal end of the housing and spaced a preset distance apart from the ferromagnetic mass, wherein the magnet is arranged outside the distal end of the housing, and wherein the ferromagnetic mass is configured to oscillate relative to the magnet when vibrations are transferred to the stabilizer from the archery bow; and
    wherein a magnetic field interaction between the magnet and the ferromagnetic mass creates a drag force which dampens oscillation of the ferromagnetic mass relative to the magnet.

2. The stabilizer of claim 1, wherein the magnet is a rare-earth magnet.

3. The stabilizer of claim 1, wherein the preset distance apart of the magnet and the ferromagnetic mass is less than 10 mm.

4. The stabilizer of claim 1, wherein the magnet is arranged within the distal end of the housing.

5. The stabilizer of claim 4, wherein the magnet is arranged to oscillate within the distal end of the housing.

6. The stabilizer of claim 1, wherein the magnet and ferromagnetic mass are arranged in a damping component mounted to the distal end of the housing, wherein the damping component holds the ferromagnetic mass and the magnet at a spaced apart distance and allows the ferromagnetic mass and magnet to oscillate relative to each other when vibrations are transferred to the stabilizer from the archery bow.

7. A stabilizer for an archery bow, comprising:
    a hollow housing having a length defining a proximal end and a distal end, wherein the proximal end is configured to secure the housing to an archery bow;
    a mass formed of a ferromagnetic material mounted to the distal end of the housing;
    a magnet assembly extending within an interior portion of the housing, the magnet assembly including:
        a shaft having a first end and a second end, wherein the first end of the shaft is mounted to the proximal end of the housing so that the shaft extends within the housing towards the distal end of the housing;
        a magnet mounted to the second end of the shaft and arranged at a preset distance apart from the ferromagnetic mass and wherein the magnet is configured to oscillate relative to the ferromagnetic mass when vibrations are transferred to the stabilizer from the archery bow; and wherein a magnetic field interaction between the magnet and the ferromagnetic mass creates a drag force which dampens the oscillation of the magnet.

8. The stabilizer of claim 7, wherein the magnet and the mass are arranged a preset distance apart, and wherein the distance is less than 10 mm.

9. The stabilizer of claim 7, wherein the distance between the magnet and the mass is adjustable between 1 mm and 10 mm.

10. The stabilizer of claim 7, wherein the housing is made from carbon fiber.

11. The stabilizer of claim 7, wherein the magnet is a rare-earth magnet.

12. A stabilizer for an archery bow, comprising:
a housing having a length defining a proximal end and a distal end, wherein the proximal end is configured to secure the housing to an archery bow;
a magnetic damping assembly mounted to the distal end of the housing, the damping assembly including;
a damping component formed of an elastic vibration damping material, wherein the damping component includes a first end and a second end;
a ferromagnetic mass housed within one of the first end and the second end of the damping component;
a magnet housed within the other of the first end and the second end of the damping component;
wherein the damping component holds the ferromagnetic mass and the magnet at a spaced apart distance and allows the ferromagnetic mass and magnet to oscillate relative to each other when vibrations are transferred to the stabilizer from the archery bow; and
wherein a magnetic field interaction between the magnet and the ferromagnetic mass creates a drag force which dampens the oscillation of the ferromagnetic mass and magnet relative to each other.

13. The stabilizer of claim 12, wherein the housing is made from carbon fiber.

14. The stabilizer of claim 12, wherein the damping component is made from rubber.

15. The stabilizer of claim 12, wherein the magnet is a rare-earth magnet.

16. The stabilizer of claim 12, wherein the housing includes an insert mounted to the distal end of the housing.

17. The stabilizer of claim 12, wherein the stabilizer includes a shaft with a first end mounted to the distal end of the housing and wherein the magnetic damping assembly is mounted to a second end of the shaft.

18. The stabilizer of claim 17, wherein the stabilizer includes at least one weight mounted between the first end and second end of the shaft.

* * * * *